June 2, 1931.   F. A. LUNDAHL   1,808,309
VEHICLE TOY
Filed May 1, 1926   5 Sheets-Sheet 2

Inventor:
Frederick A. Lundahl.
By
Attys.

June 2, 1931.　　　F. A. LUNDAHL　　　1,808,309
VEHICLE TOY
Filed May 1, 1926　　5 Sheets-Sheet 3
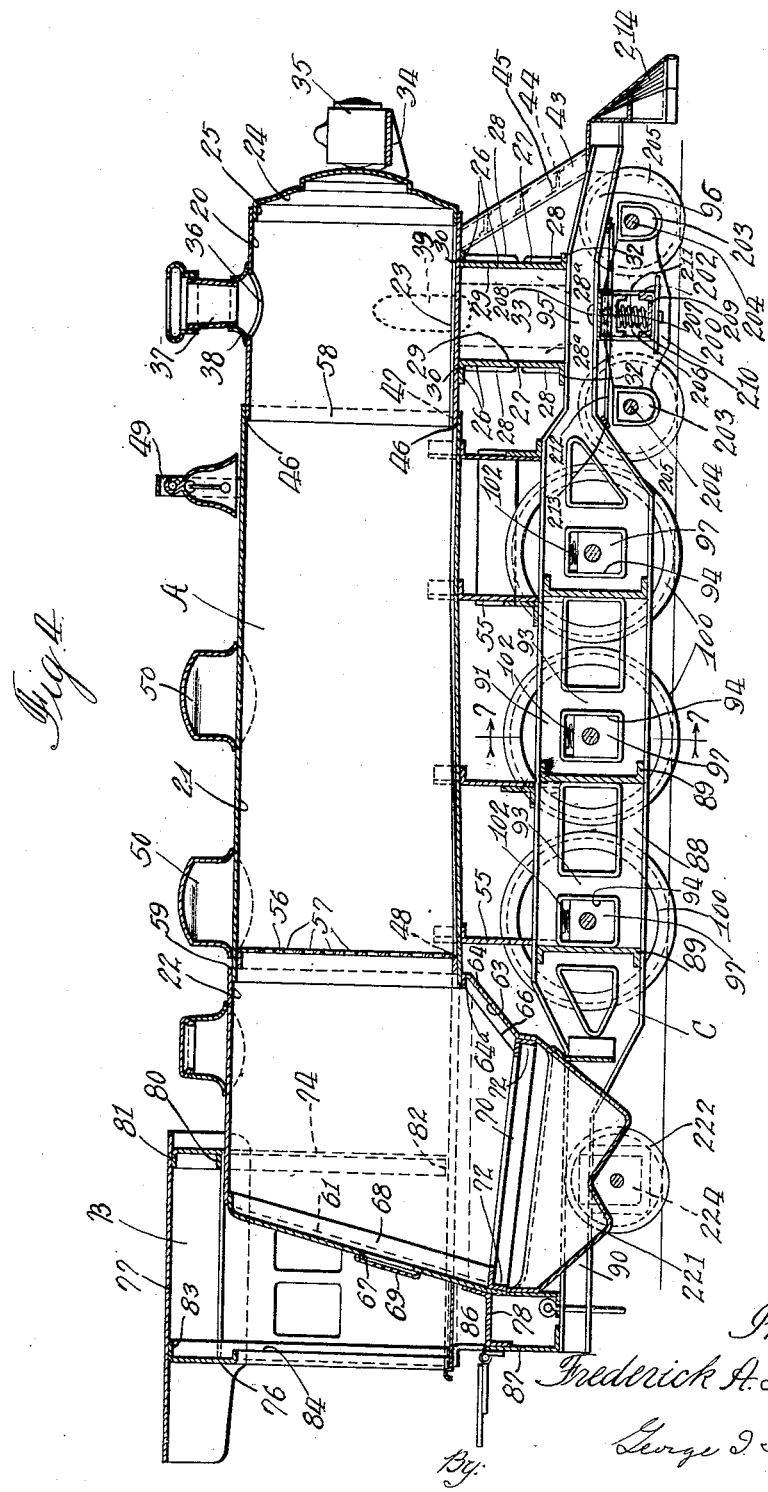
Inventor
Frederick A. Lundahl
By George I. Haight
Attys.

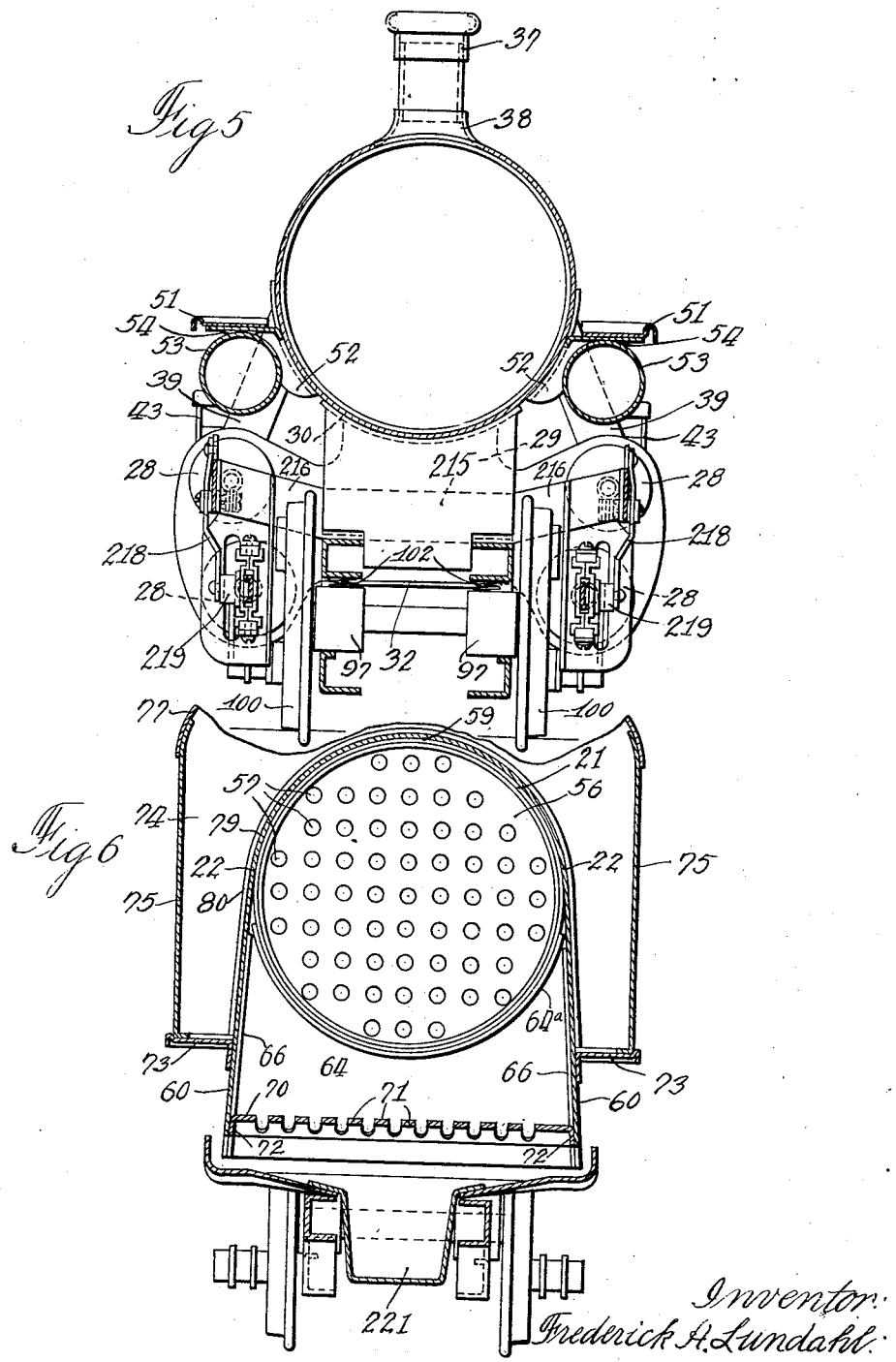

June 2, 1931.  F. A. LUNDAHL  1,808,309
VEHICLE TOY
Filed May 1, 1926  5 Sheets-Sheet 5
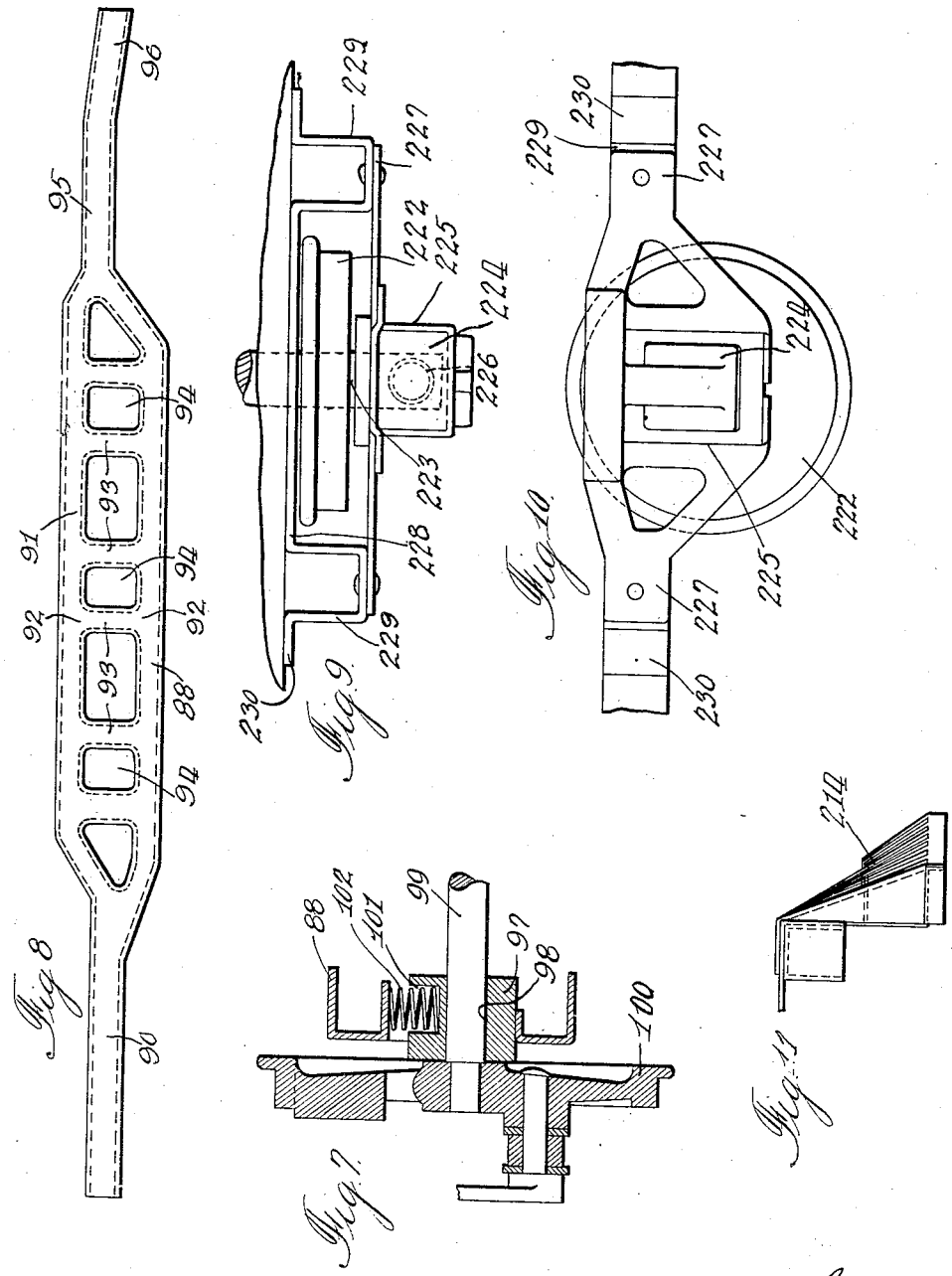
Inventor:
Frederick A. Lundahl.
By George I. Haight
Attys Patented June 2, 1931

1,808,309

UNITED STATES PATENT OFFICE

FREDERICK A. LUNDAHL, OF ROCK ISLAND, ILLINOIS; MARIE LUNDAHL, EXECUTRIX OF SAID FREDERICK A. LUNDAHL, DECEASED, ASSIGNOR TO BUDDY "L" MFG. CO., OF EAST MOLINE, ILLINOIS, A CORPORATION OF ILLINOIS

VEHICLE TOY

Application filed May 1, 1926. Serial No. 105,906.

This invention relates to improvements in vehicle toys.

One object of the invention is to provide a vehicle toy made mainly of sheet metal and which is very economical to manufacture, exceedingly rigid in construction and well adapted to withstand rough, hard usage, said toy being made up to provide a miniature locomotive, including a boiler, cab and running gear, and associated parts, the various parts of the locomotive being rigidly fabricated and of such strength as to support in excess of several hundred pounds without injury, whereby the toy may be used as a vehicle for transporting a child from place to place, if desired.

Another object of the invention is to provide a unitary welded locomotive superstructure, including boiler, cap and the appurtenances corresponding to those of a commercial locomotive, by means of a novel process of assembling and welding together pre-arranged portions, which consists in first making up each section as an independent unit and applying thereto its respective appurtenances, then telescopically successively assembling the independent units and welding said units together at the overlapped edges thereof.

Another object of the invention is to provide a novel running gear assembly upon which a super-structure of the above character is rigidly mounted, the running gear comprising continuous, integrally formed side frames with which are associated yieldably mounted driving wheels, a front pivoted truck, and rear trailer wheels, the frame being provided with integral extensions at the front and rear thereof upon which the boiler unit is supported, together with various auxiliary parts of the locomotive such as the pilot, imitation steam cylinders, and the like, all of which are formed of sheet metal and spot welded in a manner to produce an exceedingly strong and rigid arrangement.

Other objects of the invention relate to certain details of construction by which economy of manufacture is permitted and the rigidity and durability of the toy as an entirety is increased, as will more fully appear from the description and claims hereinafter set forth.

Figure 1:
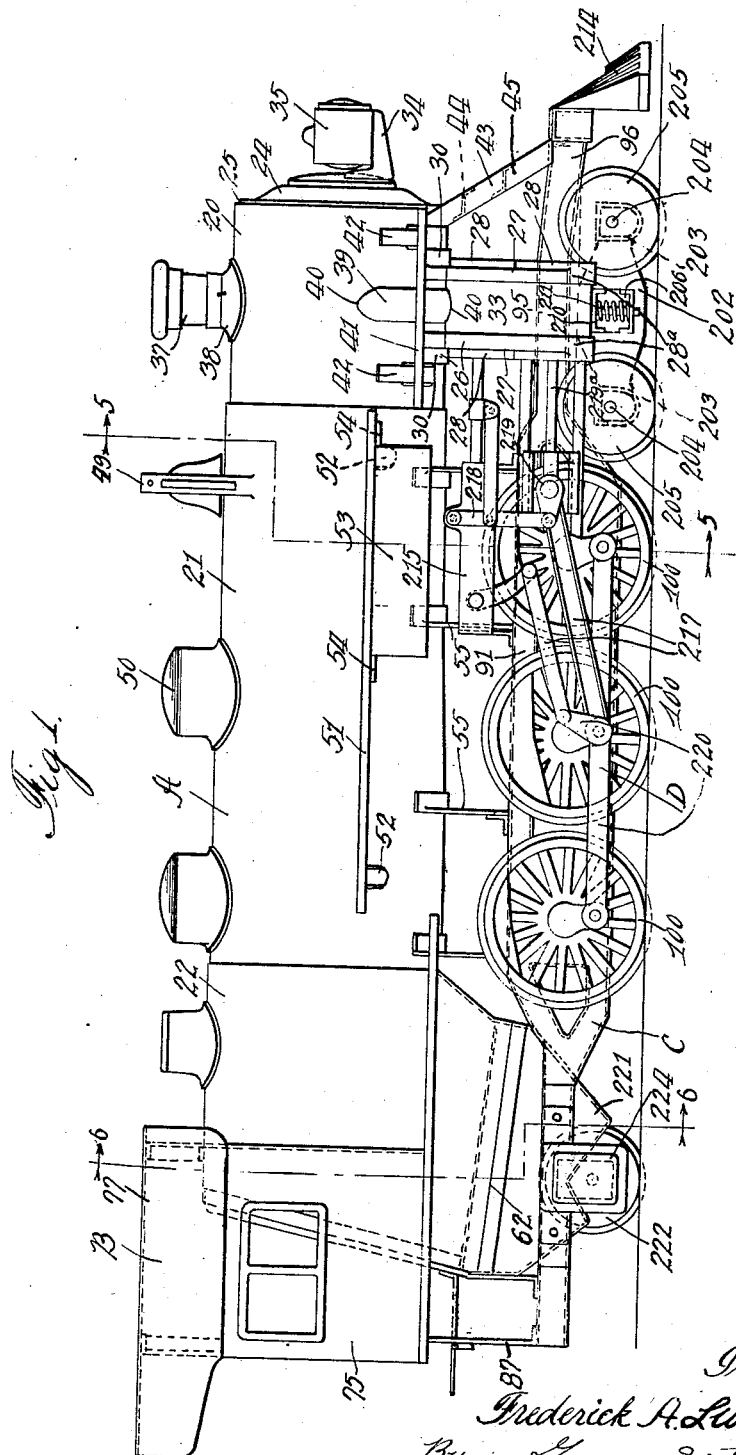
Figure 2:
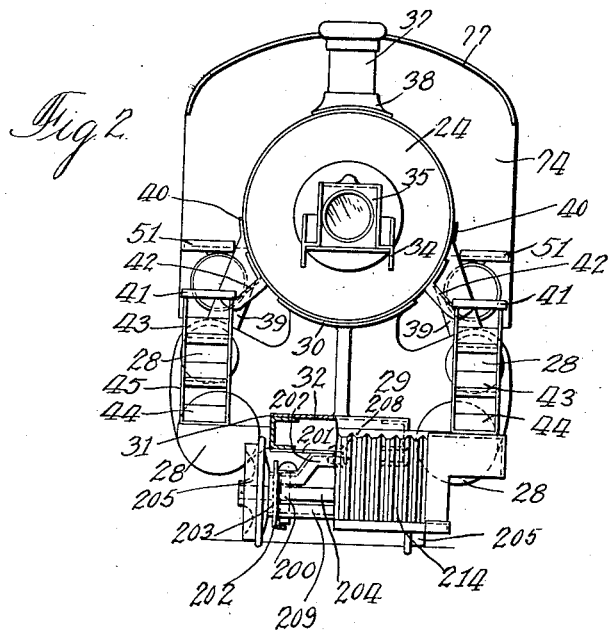
Figure 3:
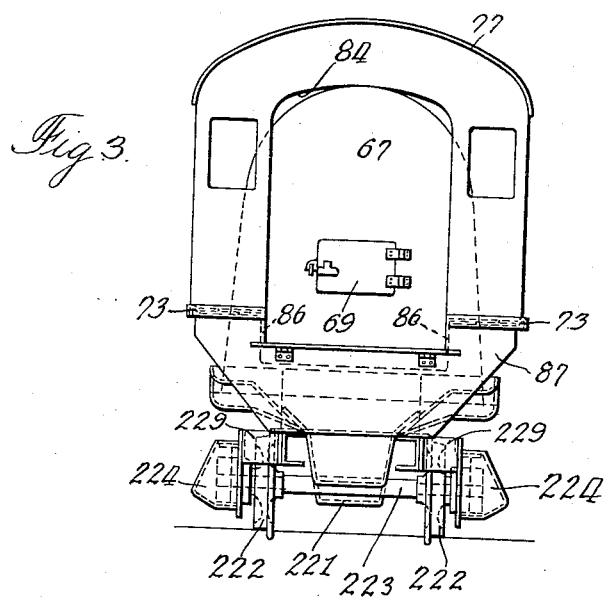

In the drawings forming a part of this specification, Fig. 1 is a side, elevational view of the toy locomotive embodying my improvements. Fig. 2 is a front elevation of the locomotive. Fig. 3 is a rear elevation of the locomotive. Fig. 4 is a longitudinal, vertical, sectional view through the locomotive, as shown in Fig. 1. Fig. 5 is a transverse, vertical, sectional view through the locomotive substantially upon the line 5—5 of Fig. 1. Fig. 6 is a transverse, vertical, sectional view through the locomotive substantially upon the line 6—6 of Fig. 1. Fig. 7 is a fragmentary, vertical, transverse sectional view of the invention on line 7—7 of Fig. 4. Fig. 8 is a detailed view of the side frame per se of the locomotive. Fig. 9 is a fragmentary top plan view of the locomotive trailer wheels in position. Fig. 10 is a side elevational view of the arrangement shown in Fig. 9. Fig. 11 is a detailed front elevational view of the pilot used with the invention.

Referring to the drawings, the locomotive comprises broadly a boiler A, cab B, frame C, and running gear D.

The boiler unit A comprises preferably a forward section 20, an intermediate section 21, and a firebox sheet 22. The forward section 20 is made up of heavy gauge sheet metal, and is cylindrical in cross section, the meeting edges being overlapped and secured by a welded lap joint as indicated at 23. The forward end of the section 20 is closed by a cup shaped member 24 made up of pressed sheet metal, the flanges 25 of which telescopically fit within the end of the cylindrical section 20 and are spot welded to said section.

Welded to the forward section 20 at its underside is a cylinder arrangement indicated generally by the reference character 26. Said cylinder arrangement comprises front and rear plates 27—27, each of said plates extending transversely entirely across the locomotive. Each of said plates is formed by pressing the metal adjacent its opposite ends to simulate cylinder heads 28—28. The opposite end portions of the plates 27—27 along their marginal edges are provided with inturned flanges 28ª—28ª, which flanges terminate at intermediate portions 29—29 of the plates. The upper edge of each intermediate portion 29 of each plate extends upwardly and is provided with an out-turned flange 30 arranged in semi-circular form and adapted to fit the contour of the section 20 of the boiler, the flange 30 being spot welded to the section 20. The lower edge of each intermediate portion 29 of each plate is cut out as indicated at 31 and provided with an out-turned flange 32, the flange 32 being adapted to be spot welded to the frame C as hereinafter described. The two plates 27—27 are connected by a sheet 33, which extends between the plates at the edges thereof and fits within the marginal flanges 28ª—28ª, the edges of the connecting sheet being spot welded to said flanges. The cylinder arrangement is first assembled and spot welded together, and then the flanges 30—30 are spot welded to the boiler section 20.

A searchlight bracket, indicated at 34, is then spot welded to the head 24, and a searchlight indicated at 35 is secured to the bracket by welding. The section 20 is provided with an opening 36 and disposed over the opening and communicating therewith is a smokestack 37, which smokestack is pre-formed and has its flanges 38 spot welded to the forward section 20. Steam pipes 39—39 are provided, one of which is disposed at one side of the section 20, the other at the opposite side, each of said pipes being made up of a single piece of material arranged in cylindrical formation and having extensions 40—40 at its ends, which extensions are spot welded to the connecting sheet 33 of the cylinder arrangement and to the wall of the forward section 20 of the boiler. Running boards 41—41 are provided, one of which is placed at each side of section 20, each of said running boards being welded to brackets 42—42, which brackets are welded to the wall of the section 20. Secured to the forward end of each running board 41 is a ladder 43. Each ladder 43 is made up of a single piece of material having punched out bent steps 44—44, and turned flanges 45—45 at the ends of the steps, which flanges serve as the posts or stiles of the ladder, the component parts of the ladder being pressed into shape. Each ladder is preferably assembled with the related running board 41 by welding prior to welding the running board and its supporting brackets to the section 20.

The intermediate section 21 is also made up of heavy gauge sheet metal, and is of somewhat frusto-conical formation, tapering from the rear forwardly, the intermediate section having its meeting edges secured by a lap welded joint as indicated at 46, the metal of the overlapped edge being cut away as indicated at 47 and 48, at each end of the section, so as to provide only one thickness of material at the end portions of the section. Secured to the intermediate section 21 are appurtenances of a character which correspond to those ordinarily placed upon a commercial locomotive. In this instance, a bell bracket 49, and steam domes 50—50 are provided, which parts are pre-formed and secured to the section 21 by welding. Running boards 51—51 are provided, one of which is disposed at each side of the section 21 and each of said running boards 51—51, is welded to brackets 52—52, which are in turn welded to the intermediate section 21. Secured beneath each of the running boards 51—51 is a cylinder 53. Each cylinder is of one piece construction, made up from a blank and welded, said cylinder being provided with integral extensions 54—54, which are spot welded to the related running board bracket.

Secured to the under-surface of the section 21 are supporting braces 55—55, each of which is provided with an integral flange arranged in semi-circular form, which flange fits about the intermediate section 21 and is welded thereto. A cup-shaped member 56 is provided having the flange thereof rearwardly disposed, which cup-shaped member is inserted into the end of the intermediate section 21, and the flange spot welded to said section. The body of the member 56 is provided with a plurality of apertures 57, as shown in Fig. 6, which apertures simulate the ends of boiler tubes ordinarily found in a commercial locomotive. The section 21 telescopically fits over the rear end of the cylindrical section 20 and is spot welded thereto as indicated at 58.

The fire box sheet 22 is bent into substantially parabolical form, see Fig. 6, and the forward edge thereof laps over the rear edge of the tapered section 21, as shown at 59, and is spot welded thereto. The fire box sheet 22 extends rearwardly into the cab B, and is provided with a continuation or extension at each side as indicated at 60—60, which extensions project below the bottom of the section 21. The rear end of the fire box sheet is obliquely inclined as indicated at 61, and the lowermost side edges thereof are inclined downwardly and forwardly, as indicated at 62, the forward edges of the sheet 22 having rearwardly inclined portions beneath the section 22 as shown at 63. The forward portion of the fire box below the section 21 is closed by a sheet 64, which has a turned semi-circular flange 64ª which fits the lower surface of the section 21, and is spot welded thereto, the sheet 64 also having side flanges 66—66, which are welded to the inclined edges 63 of the extensions 60—60 of the firebox sheet. The rear open portion of the fire box sheet 22 is closed by means of a plate 67, said plate being provided with an inwardly turned flange 68 which fits within the end portion of the fire box sheet 22, the flange 68 being spot welded at suitable points to the fire box sheet 22. The plate 67 is provided with a hinge door as indicated at 69 to give access to the fire box. The lower portion of the fire box is closed by means of a grate 70, said grate being in the form of a sheet metal plate having slots cut therein to provide bars 71, simulating grate bars, the plate having flanges 72 on each of its edges which are outwardly turned and spot welded to the side extensions 60—60 of the fire sheet 22, the forward portion 64 of the fire box, and the plate 67.

The cab B comprises bottom supports 73—73, front wall 74, side wall 75—75, rear wall 76, roof 77, and floor 78. The bottom supports 73—73 are similar in construction, one of the same being disposed on each side of the fire box sheet. Each comprises an angular member having a flange spot welded to one of the side walls 60 of the fire box sheet 22, and an angular portion which projects outwardly in a horizontal direction to provide a shelf-like support. The front cab wall 74 is provided with a cut out portion 79 of a shape adapted to fit over the fire box sheet 22, the front sheet 74 having a flange 80 extending along the edges of the cut out portion 79, which flange is spot welded to the sheet 22. The front cab wall 74 at its free edge is provided with an inturned flange 81, and at its bottom edges with inturned flanges 82 which rest upon and are spot welded to the bottom support 73—73. The side walls 75—75 of the cab are of similar construction and fit over the flange 81 of the cab front sheet and are welded to said flange. The cab back sheet 76 is provided with an inturned flange 83 which fits within the side walls 75—75 of the cab, and is spot welded to said walls. The back sheet 76 is provided with a cut out portion to provide a door 84 to permit access to the cab. The cab roof 77 fits over the side, front and rear walls of the cab and is spot welded to the flanges 81 and 83 of the front and back cab walls. The floor 78 of the cab at the rear of the fire box sheet 22 is provided by a formed sheet of material which extends into the cab, the forward edge of said sheet having a flange which is spot welded to the rear fire box plate 67, said floor sheet having at the opposite side edges upwardly extending walls 86—86 which are provided at their extremities with flanges welded to the supports 73—73. An end brace sheet 87 has one flange spot welded to the under-surface of the cab, and extends downwardly and is secured to the underframe C as best shown in Fig. 4, the brace 87 serving as a support for the boiler and cab unit when in operative position.

The assembling and fabrication of the boiler proper, the fire box and cab, involve a process which is of great importance in providing a unitary spot welded structure of great strength and rigidity, the various elements which go to make up the boiler and cab unit being especially formed and assembled as independent spot welded sections, including all of the appurtenances corresponding to those placed upon like parts in a commercial locomotive, which sections are then assembled successively in such a manner as to permit spot welding at the points desired to provide a rigid and unitary structure of great strength.

The process consists in providing the cylindrical unit 20 and forming the same from a blank of sheet metal with its free edges lapped over and spot welded, the lapped over portions being cut away at the ends of the cylindrical section to provide for the insertion of the pressed cup-shaped member 24. The cup-shaped member 24 is next formed and the searchlight bracket 34, and the searchlight 35 spot welded thereto. The cup-shaped member is then telescopically fitted within the end portion of the cylindrical section 20, thus providing an arrangement whereby spot welding tools may be inserted from the open end of the cylindrical section 20 opposite the end which is closed by the cup-shaped member, and the flange 25 of the cup-shaped member spot welded to the section 20. The cylinder arrangement 26 is then assembled and spot welded together, and the semi-circular flanges 30—30 are then spot welded to the section 20. The smokestack 37 is then separately formed and the flanges 38 thereof spot welded to the section 20. The steam pipes 39 are then formed and spot welded to the cylinder arrangement 26 and to the section 20. The running boards 41—41, the brackets 42—42, and ladders 43—43 are first assembled as a unit, and the brackets 42—42 of the running board are spot welded to the section 20.

The intermediate section 21 is made up from a suitable blank of sheet material, the free edges being adapted to be overlapped and connected by a welded lap joint, a portion of one free edge of the sheet where the joint is to be formed, adjacent the ends of the section, being cut away to permit interengagement with the cylindrical section 20, when the section 21 is applied thereto. Before application of the section 21 to the section 20, the bell bracket 49 and steam domes 50—50 are made up and spot welded to the section 21. The section 21, with the bell bracket 49 and steam domes 50—50 welded thereto, is telescopically fitted about the front section 20 and the adjacent overlapping edges of sections 20 and 21 are then spot welded together by inserting the welding tools from the open end of the intermediate section 21. After the intermediate section is fitted about the front section 20 and welded thereto, the free edges of the intermediate section are lapped over and spot welded together. The braces 55—55 then have the semi-circular flange of each spot welded to the intermediate section. The running boards 51—51 with their brackets are then assembled, and the cylinders 53 secured thereto, and the brackets spot welded to the intermediate section 21. The tube sheet 56 is then inserted with the flange thereof turned outwardly, and the flange spot welded to the wall of the intermediate section 21. This then completes the front and intermediate sections of the locomotive, each of which has spot welded thereto the appurtenances ordinarily provided on a commercial locomotive.

The fire box sheet 22 is then provided, and the plate 67 spot welded in position, after the fire door 69 has been attached thereto. The front closure 64 is then placed in position and spot welded. This makes up the fire box section, which is a complete unit with the bottom of the fire box section open so as to permit the welding operations of connecting the parts together.

The cab is then preferably assembled in the following manner: The side walls 75—75 are spot welded to the flange 81 of the front sheet 74, and to the flange 83 of the rear sheet 76, and the roof is then spot welded to the flanges of said front, back and side sheets. The bottom supports 73—73 are next spot welded to the bottom flanges of the cab front, rear and side sheets.

The cab B is then applied to the fire box section by fitting the front sheet 74 and the bottom supports 73—73 over the same, and attached by spot welding the flange 80 of the front sheet 74 and the flanges on the bottom supports 73—73, to the fire box sheet. This is done by inserting the tools from the open bottom portion of the fire box section. The floor 78 is then placed in position and welded to the plate 67, and to the supports 73—73. The unit comprising the fire box arrangement and the cab is then telescopically fitted over the rear end of the intermediate section 21, and welding tools inserted through the open bottom of the fire box section and the overlapped edges of the fire sheet and the intermediate section 21 spot welded together. The grate 70 is then placed in position with the flanges 72 turned outwardly and said flanges spot welded to the front sheet 64, the side extensions 60—60 of the fire box sheet and the rear fire box plate 67. The end brace 87 is then spot welded to the under surface of the cab.

In this manner a complete unitary, practical, integral construction of great strength and rigidity is provided, said construction including the boiler proper, the fire box arrangement, cab, cylinders, etc., together with appurtenances associated therewith corresponding to those used upon a commercial locomotive, all of which are rigidly connected together and provide an arrangement of great strength.

As before stated the running gear of the locomotive comprises the frame structure C and running gear proper D. The frame structure C including spaced side frames 88—88, said frames being connected together by transversely extending channel-shaped cross braces 89, the flanges of which are spot welded to the frames 88—88. The side frames 88—88 are identically similar in construction, and only one of the same will be described in detail. Each of said frames comprises an integral member made up of pressed sheet steel of heavy gauge, and includes a rear extension 90, channel-shaped in cross section, intermediate section 91, comprising integral spaced channel portions 92—92, said portions being connected by channel-shaped webs 93 arranged so as to provide journal boxes 94. Each frame member is also provided with an integral channel-shaped forward extension 95, which is curved downwardly adjacent its outer end, as indicated at 96.

The journal boxes 94—94 in each of the opposite side frames 88—88 are preferably three in number, each of said journal boxes being of such a character as to accommodate a bearing block 97, which is adapted to slide up and down in the journal box, as best indicated in Figs. 5 and 7. Each of the bearing blocks is provided with a journal opening 98 for the reception of one end of an axle, indicated at 99, the axle extending outwardly through the block 97 and having one of the driving wheels 100 rigidly affixed to a reduced end portion thereof. Each of the blocks 97 is provided with a socket 101 in its upper end, said socket being adapted to accommodate a coiled spring 102, the lower end of said spring being adapted to bear against the bottom of the socket and the upper end of said spring bearing against the under-surface of the top portion 92 of the frame 88. As shown in Fig. 4, the driving wheels are six in number, three of the same being disposed upon each side of the locomotive, there being three axles utilized, each of said axles having mounted on its opposite ends a wheel 100, and each of said axles being supported in a bearing block 97 in identically the same manner as that just previously referred to; therefore all of said axles, journal boxes, bearing arrangements, and driving wheels will be referred to by similar reference characters as designating similar parts.

The forward portions 95—95 of the frame structure C have mounted thereon a front truck arrangement indicated generally at 200. As shown, the forward portion of the frame structure has rigidly associated therewith a bolster 201. The truck proper comprises pressed metal side frames 202—202, each of which is provided with journal boxes 203—203, in which are mounted the opposite ends of axles 204—204 carrying the front and rear pairs of wheels 205—205. Each of said side frames is provided with a bolster opening 206 adapted for the reception of the opposite ends of the truck bolster 207, which is pivotally connected to the bolster 201, as indicated at 208. A spring plank 209 has its opposite ends disposed in the openings in the side frames. The opposite ends of the truck bolster 207 rest upon coiled springs indicated at 210, each spring being held in position in its side frame by a suitable pin indicated at 211. A longitudinally extending spring 212 is extended through the truck bolster and is fastened at its opposite ends by suitable brackets 213 secured to the frame of the locomotive. The spring 212 thus assures ordinary travel of the truck in a straight line path. When, however, the truck is guided definitely around a curve, the spring yields sufficiently to accommodate this action of the truck.

Mounted upon the down-turned portions 96 of the frame is a pilot 214 made up of pressed sheet metal and formed into shape as shown in Figs. 2 and 17.

At the forward ends of the intermediate portions 91 of the side frames is a transversely arranged carrying member 215, which is supported upon the upper surfaces of the intermediate sections of the frame structure, the outer ends of said member being inclined upwardly as indicated at 216. The carrying member serves as a support for the forward portions of the connections 217, which cooperate with the cylinder, said connections including a member 218 connected to the crank lever 219 and adapted to reciprocate the piston rod 219ª at each side of the locomotive, connections 220 being provided which serve to insure movement of the driving wheels in unison, all of which connections are practically identical with the driving connections and valve mechanism of a commercial locomotive.

The rear portions 90—90 of the frame structure have mounted thereon a member providing an ash pit, as indicated at 221. The ash pit is rigidly supported upon the frame members as best shown in Fig. 6, and is arranged to register with the lower end of the fire box adjacent the grate 70, the lower end of the fire box fitting into the ash pit and the edges of said box being spaced from the edges of the ash pit as shown in Fig. 6, so as to provide a draft therebetween.

The frame 88 is provided at its rear end with trailer wheels 222 mounted upon an axle 223, the opposite ends of the axle being supported in bearing members 224—224 provided at opposite sides of the frame structure. Each of the bearing members 224 includes a journal box section 225 in which is disposed a bearing block of substantially the same character as the bearing block 97 used in connection with the driving wheels, as shown in Fig. 7, the end of the axle being supported in bearing block, see Fig. 9, and the bearing block having a spring 226, which is interposed between the top of the block and the top of the housing provided by the bearing member 224. The bearing member 224 is provided with side extensions 227 which have their end portions riveted to a supporting bracket 228. The bracket 228 comprises a flat, elongated, longitudinally extending portion spot welded to the end members 90—90 of the frame, and is provided with looped portions 229 at each end to which the ends of the extensions 227 of the bearing member are connected, the ends of the looped members being angularly formed to provide portions 230—230 which are spot welded to the frame 88.

It will be appreciated that the frame and running gear, pilot, ash pit, etc. are assembled into a complete unit, and when in this condition is adapted for the reception of the super-structure unit which is then secured thereto by welding the cylinder flanges, supporting braces and back supporting plate to the frame.

While I have herein shown and described what I now consider the preferred manner of carrying out the invention, the same is merely illustrative, and I contemplate all changes and modifications that come within the scope of the claims appended hereto.

I claim:

1. The herein described process of making a locomotive toy super-structure, comprising a plurality of hollow boiler sections of sheet metal, each section being of a size as to exclude the entrance of a workman thereinto having attached thereto its appurtenances corresponding to those of a commercial locomotive, which consists in first making up each section as an independent welding unit and applying thereto its respective appurtenances, then manually manipulating said sections to telescopically assemble the front and next sections and permanently welding said two sections together at the edges thereof by insertion of welding tools through the open end of one of said sections, then manually telescopically assembling the next rearward section with the rear end of said second section, and welding the two latter sections together in a like manner at the adjacent edges thereof.

2. The herein described process of making a locomotive toy super-structure, comprising a plurality of super-structure sections, one of said sections having attached thereto a cab structure, and the other sections having appurtenances attached thereto corresponding to those of a commercial locomotive, which consists in first making up each section as an independent unit and applying thereto the cab structure and appurtenances to the respective sections, and then manually telescopically assembling two of said sections and welding the same together at the overlapped edges thereof by the insertion of welding tools through the open end of one section, and then telescopically assembling the next section with the free end of the welded sections, and welding the same together in a like manner at the telescopically lapped edges.

3. The herein described method of making a locomotive toy super-structure, comprising a plurality of tubular sections, each section having welded thereto its appurtenances corresponding to those of a commercial locomotive, which consists in first making up each tubular section as an independent unit and providing related appurtenances for each of said units; inserting spot welding implements into the tubular section to spot weld the appurtenances thereto; manually manipulating said sections to telescopically engage the edges of one section with the edges of another section; inserting welding implements into the tubular sections to spot weld the telescopically arranged edges of said sections together; then manually telescopically engaging the edges of another section with the free edges of the related section and inserting spot welding implements into said latter section to weld the overlapped edges thereof.

4. The herein described method of making a locomotive toy super-structure, including a boiler portion and a cab portion, which consists in first making up the boiler portion from sheet metal as an independent unit and provided with an opening therein, then making up a cab portion with an opening adapted to communicate with the opening in said boiler portion, and then welding the cab portion to the boiler portion by the insertion of welding implements through the openings provided.

5. The herein described method of making a locomotive toy super-structure, including a boiler portion and the cab portion, which consists in first making up the boiler portion as an independent unit with an opening communicating with the cab portion, then making up a cab portion, and then welding the cab portion to the boiler portion by inserting welding tools through said opening and spot welding portions of the cab to the boiler portion.

6. The herein described method of making a locomotive toy super-structure, including a cab, fire box, and boiler portion, which consists in first making up a fire box with an opening adapted to be closed by a grate portion; then making up a cab as a completed unit; then securing said cab and said boiler portion to said fire box by insertion of welding implements through the fire box opening, and subsequently closing said opening.

7. The herein described process of making a locomotive toy super-structure, comprising a boiler portion made up of a plurality of boiler sections, a fire box section, and a cab section, each of said boiler sections having its appurtenances corresponding to those of a commercial locomotive, which consists in first making up the boiler sections, fire box section, and cab section and applying to the boiler sections their respective appurtenances, and securing the cab section, said sections having openings adapted to communicate when assembled to the fire box section; then telescopically assembling the boiler sections and welding the same together at the overlapped edges thereof by insertion of welding tools through the communicating openings, and then telescopically assembling the fire box section with the rear end of the second boiler section, and welding the same together at the telescopically lapped edges thereof in a like manner.

8. The herein described method of making a locomotive toy super-structure corresponding to that of a commercial locomotive, which consists in first making up a plurality of sections and closures, and applying the appurtenances to each section, then telescopically engaging one closure with the open end of one of said sections and spot welding the telescoped edges thereof together by insertion of tools through the open end, then telescopically engaged the free edges of a closed section with the edges of the related section and welding the telescoped edges of said sections together from the open end of said second section, and then telescopically engaging the next section with the free edges of the related section and welding the telescoped edges thereof together; and then telescopically engaging a closure with the opening in the section last secured and welding the same from the exterior of said section.

9. The herein described process of making a locomotive toy super-structure, comprising a boiler portion and a fire box, which consists in first making up the boiler portion in substantially tubular sections, the fire box section being provided with a laterally disposed opening; then successively assembling said sections by telescopically overlapping the related edges thereof and welding the same together; making up an independent cab unit; and welding said cab unit to said fire box section by the insertion of welding implements through the laterally disposed opening therein, and then closing said opening by a grate arrangement.

10. The herein described process of making a locomotive toy, comprising a unitary super-structure and a running gear assembly, said super-structure comprising a plurality of sections, each section having attached thereto its appurtenances corresponding to those of a commercial locomotive, which consists in first making up each section as an independent unit with an opening adapted to communicate with a related section and applying to each section its respective appurtenances, then successively manually manipulating said sections to telescopically assemble the various sections and welding the telescoped edges together by the insertion of welding implements through the communicating openings of said sections, and then making up said running gear assembly and welding the same to said super-structure.

11. As an article of manufacture, an elongated side frame comprising end portions and integral spaced intermediate members, said intermediate members being connected by integral transverse elements so as to form bearing openings defined by continuous integral walls.

12. As an article of manufacture, an elongated side frame comprising end portions and integral spaced intermediate longitudinally extending portions, said end portions and intermediate portions being formed of material channel shaped in cross section, said intermediate portions being connected at intervals by integral transverse members to provide bearing openings.

13. As an article of manufacture, an elongated side frame comprising end portions and spaced intermediate longitudinally extending portions, said intermediate portions being connected by integral transverse members to provide continuously defined bearing openings.

14. In a toy locomotive of the character described, the combination with a super-structure; of an underframe supporting said super-structure, said frame being provided with bearing openings defined by continuous integral walls of said underframe; and bearing blocks slidably mounted in said openings; yieldable means interposed between said bearing blocks and a portion of said underframe; and driving means having the axles thereof rotatably journaled in said bearing blocks.

15. In a toy locomotive, the combination with a boiler unit and wheeled frame; of means associated with said boiler unit and frame, said means comprising transversely extending spaced members and a connecting web extending between the marginal edges of said members and rigidly connected thereto, said means providing a unitary four cylinder arrangement.

16. In a toy locomotive of the character described, the combination with the rear portion of the locomotive structure; of trailer wheels having an axle associated therewith and projecting outwardly of said wheels; means for mounting said wheels on the rear end portion of the locomotive, including cup-shaped member having a bearing block therein for the reception of one end of said axle; and means for securing said cup-shaped member to said locomotive structure.

17. In a toy locomotive of the character described, the combination with a boiler unit; an underframe for supporting said boiler unit and having bearing openings defined on all sides by integral portions of said frame; and driving wheels supported by the means defining said opening, said wheels being yieldably mounted for vertical movement independent with respect to each other.

18. In a locomotive toy of the character described, the combination with a boiler unit; of an underframe structure upon which said boiler unit is mounted, said underframe structure including side members provided with a plurality of bearing openings surrounded by a material of which said frame is formed; and driving wheels having bearing blocks associated with the axles thereof and slidably mounted in the bearing openings in said underframe.

19. In a toy, the combination with a railway vehicle having running gear associated therewith, said running gear including a pivoted truck having wheels adapted for travel upon a track, or upon a plain surface; and a longitudinally disposed spring extending through said truck and secured at its ends to the frame of the vehicle for maintaining the pivoted truck of said vehicle in alignment with the remainder of the running gear when said toy is operated upon plain surfaces.

20. In a toy locomotive, the combination with a unitary fabricated superstructure, including a boiler portion, a fire box portion and a cab, corresponding to those of a commercial locomotive and each having appurtenances rigidly associated therewith; and a unitary frame for said locomotive having running gear operatively and permanently assembled therewith, said running gear comprising driving wheels and a front truck, said frame and super-structure being capable of manual manipulation to effect assembly of one unit with the other, said units being rigidly connected in permanently assembled relation.

In witness that I claim the foregoing I have hereunto subscribed my name this 19th day of April, 1926.

FREDERICK A. LUNDAHL.